United States Patent [19]

Kim

[11] Patent Number: 5,386,325
[45] Date of Patent: Jan. 31, 1995

[54] VIDEO SIGNAL PROCESSING SYSTEM FOR DOUBLE DECK TAPE RECORDER

[75] Inventor: Dong-Young Kim, Suwon, Rep. of Korea

[73] Assignee: SamSung Electronics Co., Ltd., Suwon, Rep. of Korea

[21] Appl. No.: 69,678

[22] Filed: Jun. 1, 1993

Related U.S. Application Data

[63] Continuation of Ser. No. 807,641, Dec. 13, 1991, abandoned, which is a continuation of Ser. No. 634,963, Jan. 3, 1991, abandoned, which is a continuation of Ser. No. 903,032, Sep. 2, 1986, abandoned.

[30] Foreign Application Priority Data

Jun. 27, 1986 [KR] Rep. of Korea ............... 5205/1986
Jun. 28, 1986 [KR] Rep. of Korea ............... 5238/1986

[51] Int. Cl.$^6$ .......................... H04N 5/78; G11B 5/86
[52] U.S. Cl. ........................ 360/33.1; 360/15; 360/61; 358/335
[58] Field of Search ............. 360/33.1; 369/71, 19; 358/335

[56] References Cited

U.S. PATENT DOCUMENTS

| | | | |
|---|---|---|---|
| 4,031,548 | 6/1977 | Kato et al. | 358/188 |
| 4,435,842 | 3/1984 | Mayumi et al. | 369/79 X |
| 4,475,153 | 10/1984 | Kihara et al. | 369/7 X |
| 4,577,239 | 3/1986 | Sougen | 360/15 |
| 4,593,414 | 6/1986 | Koyanagi | 369/19 X |
| 4,630,133 | 12/1986 | Long | 358/335 |
| 4,768,110 | 8/1988 | Dunlap et al. | 360/15 |
| 4,847,706 | 7/1989 | Jun | 360/61 |
| 4,969,135 | 11/1990 | Tobe | 369/2 |
| 5,008,762 | 4/1991 | Sung | 360/61 |

OTHER PUBLICATIONS

GE Transistor Manual © 1969 pp. 121–125.
Billboard, 27 Apr. 1985/Fujita.
Hartlauer: "New Technologies adopted in a combined radio of equipment" Technische Mitteilungen PTT Jun. 1979.
Sharp—Model VC-5W20E Owner's Manual.

*Primary Examiner*—Aristotelis Psitos
*Assistant Examiner*—Varsha A. Kapadia
*Attorney, Agent, or Firm*—Robert E. Bushnell

[57] ABSTRACT

A video signal processing system for a double deck VTR which can accomplish the simultaneous recording/playing function in both video decks and the dubbing function between two types of video tapes, wherein input/output select switches and input/output analog switches are located for appropriately processing the video signal between the respective devices of the double deck VTR.

20 Claims, 3 Drawing Sheets

VIDEO SIGNAL PROCESSING SYSTEM FOR DOUBLE DECK TAPE RECORDER

This is a file-wrapper-continuation of application Ser. No. 07/807,641, filed Dec. 13, 1991 now abandoned, application Ser. No. 07/634,963 filed on Jan. 3, 1991 now abandoned, and application Ser. No. 06/903,032 filed Sep. 2, 1986 now abandoned.

FIELD OF THE INVENTION

The present invention relates generally to a video signal processing system for a double deck VTR including two video decks, especially two different formats of video decks, and more specifically to a video signal processing system for a double deck VTR which can accomplish the simultaneous recording/playing function in both video decks and the dubbing function between two types of video tapes.

DESCRIPTION OF THE PRIOR ART

Nowadays various kinds of VTRs, for example VHS format, format and 8 mm format VTR's have been put into practical use. These conventional VTR's are all single deck VTRs, and have the following disadvantages in practical use: (1) In general, only a VHS type (12.65 mm type) video tape can be used in a VHS format VTR, and only an 8 mm type video tape can be used in an 8 mm format VTR. Accordingly, if one has only a VHS format VTR but happens to have an 8 mm type video tape, it is not possible to use the 8 mm type video tape. However, in the situation where the use of the 8 mm type video tape was unavoidable, one would have the inconvenience of having to buy a special 8 mm format VTR. (2) Furthermore, in cases where it is necessary to dub a program recorded on a VHS type video tape onto an 8 mm type video tape or vice-versa, one would have to purchase two different formats of VTRs at substantial cost and inconveniently connect them to each other by using an outer connection plug.

For the above reasons, there has been a gradual increase in the need for a double deck VTR which comprises two different video deck formats, in which any type of video tape can be used and which is capable of performing the dubbing function between two video tapes of different types.

SUMMARY OF THE INVENTION

It is an object of the present invention to provide a video signal processing system for a double deck VTR including two different formats of video decks, which can accomplish the simultaneous recording/playing function in both video decks and the dubbing function between two types of video tapes.

To achieve the above mentioned object, the video signal processing system for a double deck VTR according to the first embodiment of the present invention comprises a video tuner for converting the radio frequency (RF) signal received through an antenna into a video signal; a first format video deck for loading a first type video tape; a second format video deck for loading a second type video tape; an RF converter for alternatively receiving the video signal from each video deck and converting it into an RF signal, and transmitting the converted RF signal to a TV receiver; an input select switch for producing an input control signal, which is used to select the input video signals to be applied to said respective video decks; an output select switch for producing an output control signal, which is used to select the output video signal to be converted to RF signal in said RF converter; a pair of input analog switches for respectively applying the selected video signal to each video deck by changing their inner connecting states in accordance with said input control signal; and an output analog switch for alternatively applying the selected video signal to said RF converter by changing its inner connecting state in accordance with said output control signal.

According to the second embodiment of the present invention, the video signal processing system for a double deck VTR is characterized by a video tuner for converting the radio frequency(RF) signal received through an antenna into a video signal; a first format video deck for loading a first type video tape; a second format video deck for loading a second type video tape; an RF converter for alternatively receiving the video signal from each video deck and converting it into an RF signal, and transmitting the converted RF signal to a TV receiver; an input select switch for producing an input control signal, which is used to select the input video signals to be applied to said respective video decks; an output control integrated device for producing an output control signal in accordance with the mode of operating of each video deck, which is used to select the output video signal to be applied to said RF converter; a pair of input analog switches for respectively applying the selected video signal to each video deck by changing their inner connecting states in accordance with said input control signal; and an output analog switch for alternatively applying the selected video signal to said RF converter by changing its inner connecting state in accordance with said output control signal.

BRIEF DESCRIPTION OF THE DRAWINGS

The above and other objects and features of the present invention will be apparent from the following description of the preferred embodiments of the invention in conjunction with the accompanying drawings, wherein.

DETAILED DESCRIPTION OF THE PREFERRED EMBODIMENTS

Figure 1:
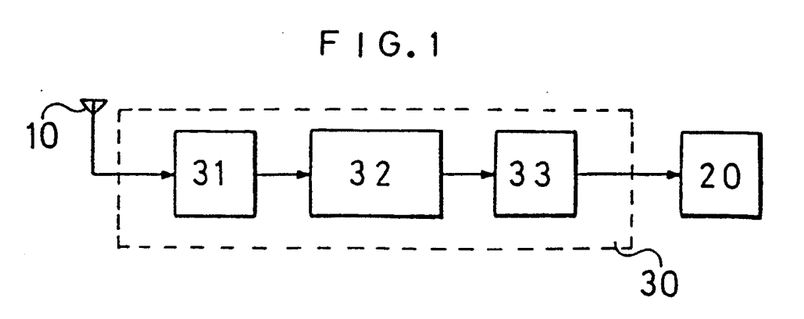
FIG. 1 is a block diagram of a conventional single deck VTR.

Referring to FIG. 1, there is shown a schematic block diagram of the conventional single deck VTR 30 which includes a video tuner 31 for converting the RF signal received through an antenna 10 at VHF frequencies of between 54 MHz and 216 MHz (channels 2 to 13) or UHF frequencies of between 470 MHz and 890 MHz (channels 14 to 83) into a video signal at frequency of about 4 Hz, a video deck 32 for loading a video tape (not shown), and an RF converter 33 for converting the output video signal from the video deck 32 into an RF signal which is transmitted to a TV receiver 20.

In order to construct a double deck VTR by means of combining two single deck VTR's constructed as above, separate video tuners and RF converters would be needed for each video deck. However, it is possible to reduce this requirement to one video tuner and one RF converter for both video decks by using the input-/output select switches and input/output analog switches, as shown in FIG. 2.

Figure 2:
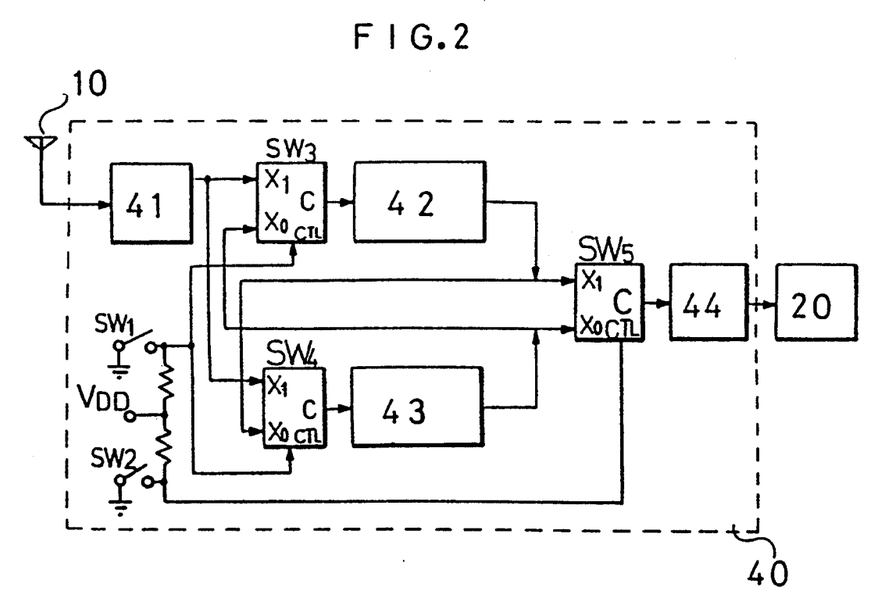
FIG. 2 is a block diagram of a double deck VTR provided with a first embodiment of a video signal processing system according to the present invention.

Now, we will describe the first embodiment of a video signal processing system for a double deck VTR by referring to FIG. 2. For purposes of illustration, we will describe the video signal processing system of a double deck VTR including a VHS format video deck and an 8 mm format video deck.

As shown in FIG. 2, the first preferred embodiment of the present invention is constructed with a video tuner 41, an 8 mm format video deck 42, a VHS format video deck 43 and an RF converter 44. It also includes the input/output select switches and input/output analog switches for appropriately processing the video signal between the respective halves of the double deck VTR.

The input select switch $SW_1$ is used to select the input video signals to be applied to the respective video decks 42 and 43. That is to say, it is used to determine whether the output video signal from the video tuner 41 or the output video signal from the opposite video deck is to be applied to each video deck. More specifically, in the case where the input select switch is in the 'off' position, the input signals to the respective video decks are selected as the output video signal from the video tuner. On the other hand, in the case where the input select switch is in the 'on' position, the input signal to each video deck is selected as the output video signal from the opposite video deck (i.e. the output signal from the 8 mm format video deck 42 is applied to the VHS format video deck 43 or vice versa.)

The output select switch $SW_2$ is used to select the output video signal to be converted to an RF signal by RF converter 44. That is to say, it is used to determine whether the output video signal from the 8 mm format video deck 42 or the output video signal from the VHS format video deck 43 is to be applied to the RF converter. More specifically, in the case where the output select switch is in the 'off' position, the output signal from the 8 mm format video deck is to be applied to the RF converter. On the other hand, in the case where the output select switch is in the 'on' position, the output signal from the VHS format video deck is to be applied to the RF converter.

Figure 3:
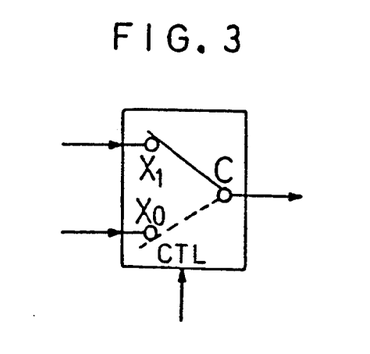
FIG. 3 is an operational diagram of the input and output analog switches employed in FIG. 2.

The input and output analog switches $SW_3$ through $SW_5$ are respectively activated by the input and output control signals which are selectively produced by the on/off operations of the input and output select switches $SW_1$ and $SW_2$. Referring to FIG. 3, in the case of the logic level of the control port CTL being at a high level (when the input and output select switches are in 'off' positions), each analog switch is activated so that the common port C and the high level port $X_1$ are automatically inter-connected. However, in the case of the logic level of the control port CTL being at a low level (when the input and output select switches are in on positions), each analog switch is activated so that the common port $X_0$ is automatically interconnected.

Therefore, the video signal processing system of Fig. 2 is controlled by the on/off operations of the input and output select switches $SW_1$ and $SW_2$.

(1) In the case where the input and output select switches $SW_1$ and $SW_2$ are both in the 'off' positions, the input video signals to be applied to the respective video decks are selected as the output signal from the video tuner 41, and the output video signal to be converted to RF signal in the RF converter 44 is selected as the output signal from the 8 mm format video deck 42.

Accordingly, it is possible to simultaneously record programs being broadcast on both video tapes which are loaded in both video decks. Also, it is possible to simultaneously play the program recorded on the 8 mm type video tape which is loaded in the 8 mm format video deck 42 and record the program being broadcast onto the VHS type video tape which is loaded in the VHS format video deck 43.

(2) In the case where the input select switch $SW_1$ is in the 'off' position but the output select switch $SW_2$ is in the 'on' position, the input video signals to be applied to the respective video decks are selected as the output signal from the video tuner 41, and the output video signal to be processed in the RF converter 44 is selected as the output signal from the VHS format video deck 43.

Accordingly, it is possible to simultaneously record programs being broadcast on both video tapes which are loaded in both video decks. Also, it is possible to simultaneously play the program recorded on the VHS type video tape and record the program being broadcast onto the 8mm type video tape.

(3) In the case where the input select switch $SW_1$ is in the 'on' position but the output select switch $SW_2$ is in the 'off' position, the input video signals to be applied to the respective video decks are selected as the output signal from the opposite video deck, and the output video signal to be processed in the RF converter 44 is selected as the output signal from the 8 mm format video deck 42.

Accordingly, it is possible to simultaneously play the program recorded on the 8 mm type video tape and dub the program recorded on the 8 mm type video tape onto the VHS type video tape or vice versa.

(4) In the case where the input and output select switches $SW_1$ and $SW_2$ are both in the 'on' position, the input video signals to be applied to the respective video decks are selected as the output signal from the opposite video deck, and the output video signal to be processed in the RF converter 44 is selected as the output signal from the VHS format video deck 43.

Accordingly, it is possible to simultaneously play the program recorded on the VHS type video tape, and dub the program recorded on the VHS type video tape onto the 8 mm type video tape or vice versa.

Figure 4:
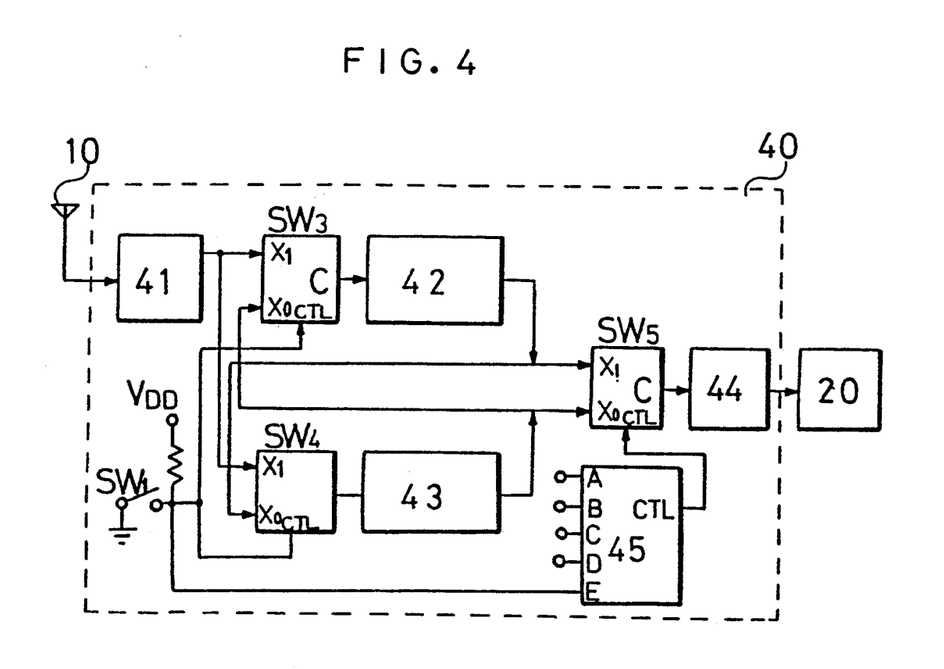
FIG. 4 is a block diagram of a double deck VTR provided with a second embodiment of a video signal processing system according to the present invention.

The second preferred embodiment of the present invention is shown in FIG. 4, in which the output control integrated device 45 is substituted for the output select switch $SW_2$ in FIG. 2 for the purpose of automatically controlling the output analog switch $SW_5$ in accordance with the particular mode of operation of each video deck.

First of all, to accomplish effective automatic control of the output analog switch $SW_5$, all possible combinations of operating modes of each video deck were investigated. The results are represented in the following table:

TABLE

| Operating modes of each video deck | | Selected video deck | Input signals to the output control integrated device | | | | |
|---|---|---|---|---|---|---|---|
| 8 mm deck | VHS deck | | A | B | C | D | E |
| PLAY | X | 8 mm deck | 1 | 0 | 0 | 0 | d |
| X | PLAY | VHS deck | 0 | 0 | 1 | 0 | d |
| REC | X | 8 mm deck | 0 | 1 | 0 | 0 | d |
| X | REC | VHS deck | 0 | 0 | 0 | 1 | d |
| PLAY | REC (8 mm) | VHS deck | 1 | 0 | 0 | 1 | 0 |
| REC (VHS) | PLAY | 8 mm deck | 0 | 1 | 1 | 0 | 0 |
| PLAY | REC (Broad) | 8 mm deck | 1 | 0 | 0 | 1 | 1 |
| REC (Broad) | PLAY | VHS deck | 0 | 1 | 1 | 0 | 1 |
| PLAY | PLAY | VHS deck | 1 | 0 | 1 | 0 | d |
| REC | REC | VHS deck | 0 | 1 | 0 | 1 | d |
| X | X | VHS deck | 0 | 0 | 0 | 0 | d |

In the above table, an 'X' denotes the appropriate operating modes of each video deck beside "PLAY" and "REC": that is, it denotes the modes "STOP", "FF", "REW", or "EJECT", etc.

The input signals A through D to the output control integrated device 45 in the above table are the control signals which are produced at particular modes of each video deck: where A is the output control signal from the 8 mm deck (8 mm format video deck) in the case where the 8 mm deck 42 performs the "PLAY" mode, B is the output control signal from the 8 mm deck in the case where the 8 mm deck performs the "REC" mode, C is the output control signal from the VHS deck (VHS format video deck) in the case where the VHS deck 43 performs the "PLAY" mode, and D is the output control signal from the VHS deck 43 in the case where the VHS deck performs the "REC" mode. And the input signal E of the output control integrated device 45 is the control signal selected by the input select switch $SW_1$. Additionally, '1' denotes that the above input signals are at high levels, and '0' denotes that the above input signals are at low levels. In other words, the high level signals are produced when the "PLAY" and "REC" buttons (not shown) of each video deck are in 'on' positions while the input select switch $SW_1$ is in 'off' position. And the low level signals are produced when the "PLAY" and "REC" buttons of each video deck are in 'off' positions while the input select switch $SW_1$ is in 'on' position. In the meantime, 'd' means "don't care", i.e. any level, either high or low, is possible.

Now we define the VHS deck has the priority when each video deck is operated in the same modes, since the VHS format VTR is normally preferred over the 8 mm format VTR.

From the above table, it is shown that the output from the VHS deck 43 is connected to the RF converter 44 except in the following four cases: (1) only the 8 mm deck 42 performs the "PLAY" mode, (2) only the 8 mm deck 42 performs the "REC" mode, (3) the VHS deck performs the "PLAY" mode while at the same time the 8 mm deck 42 performs the mode of "RECording" the output form the VHS deck 43, and (4) the 8 mm deck 42 performs the "PLAY" mode and simultaneously the VHS deck 43 performs the mode of "RECording" the program being broadcast(Broad.).

In short, the output from the 8 mm deck 42 is to be connected to the RF converter 44 in the above four cases.

By using the rules of Boolean algebra, the output CTL according to the above truth table can be represented as following equation;

$$CTL = \overline{A}\overline{B}C\overline{D} + \overline{A}B\overline{C}\overline{D} + \overline{A}BC\overline{D}E + A\overline{B}\overline{C}DE$$
$$= (A\overline{B} + \overline{A}B)\overline{C}\overline{D} + \overline{A}BC\overline{D}E + A\overline{B}\overline{C}DE$$

In the above equation, $A\overline{B}=A$, $\overline{A}B=B$, $\overline{C}D=C$, and $C\overline{D}=D$ are satisfied, since A and B or C and D cannot simultaneously be at high levels. It means that both "PLAY" and "REC" modes cannot be performed in one video deck at the same time. Therefore, the above equation can be shortened as follows:

$$CTL=(A+B)\overline{C}\overline{D}+BCE+AC\overline{E}$$

Figure 5:
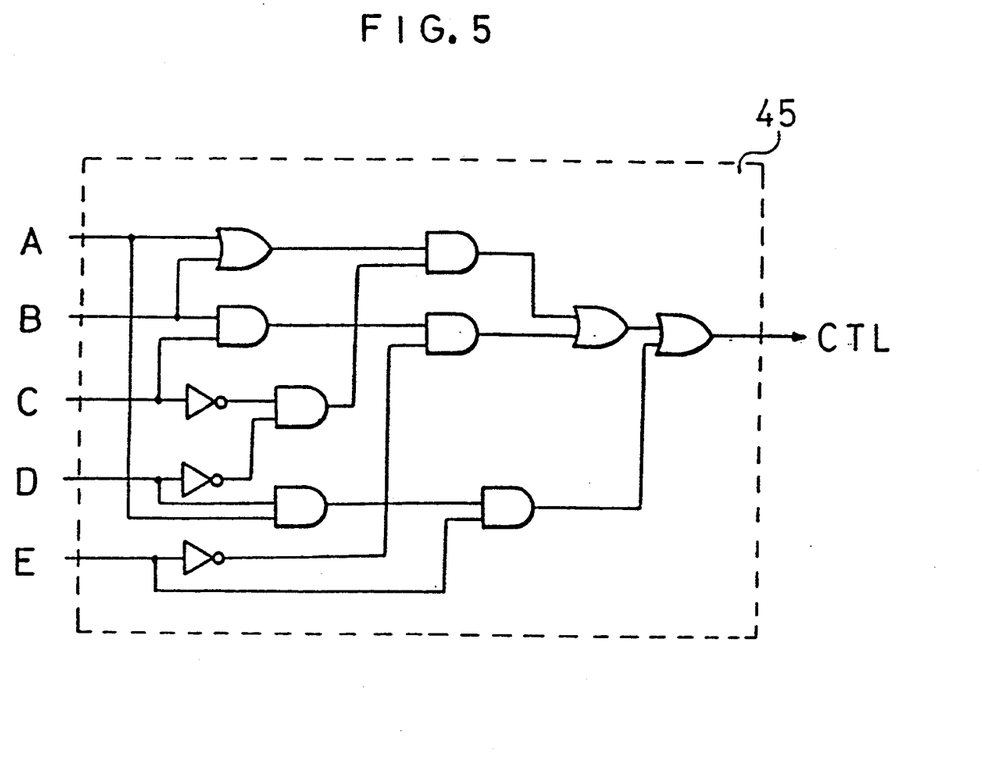
FIG. 5 is a detailed circuit diagram of the output control integrated device employed in FIG. 4.

To produce the output control signal in accordance with the above equation of Boolean algebra, the output control integrated device 45 can be constructed as shown in FIG. 5.

By applying the output control signal from the output control integrated device 45 to the control port CTL of the output analog switch $SW_5$, it is possible to automatically control the activation of the output analog switch $SW_5$ in accordance with the operating modes of each video deck. More specifically, in the above four cases, the high level control signal is produced from the output control integrated device 45 and is applied to the control port CTL of the output analog switch. $SW_5$ Then the output analog switch $SW_5$ is activated so that its common port C and high level port $X_1$ are automatically interconnected. As a result of this, the output from the 8 mm deck 42 is connected to the RF converter 44. But in the other cases, the low level control signal is produced from the output control integrated device 45 and is applied to the control port CTL of the output analog switch $SW_5$. Then the output analog switch $SW_5$ is activated so that its common port C and low level port $X_0$ are automatically interconnected. As a result of this, the output from the VHS deck 43 is connected to the RF converter 44.

According to the above described second embodiment, it is possible to accomplish the automatic control function of processing the output video signal according to the particular mode of each video deck, in addition to the functions of the first embodiment without using the output select switch $SW_2$ in FIG. 2.

As set forth above, the present invention provides a video signal processing system for a double deck VTR, which can accomplish the simultaneous recording/playing function in both video decks and the dubbing function between two types of video tapes. Furthermore, it provides a video signal processing system for a double deck VTR, which can accomplish the automatic control function of the output video signal in accordance with the particular mode of each video deck.

While there has been described what is at present considered to be preferred embodiments of the invention, it will be understood that various modifications may be made therein, and it is intended to cover in the appended claims all such modifications as fall within the true spirit and scope of the invention.

What we claimed is:

1. A video signal processing system for a double deck video tape recorder, said system comprising:
    a video tuner for converting an input radio frequency signal into an input video signal;

a first video deck for generating a first playback signal and having a play mode, a record mode, and auxiliary modes;

a second video deck for generating a second playback signal and having said play mode, said record mode, and said auxiliary modes;

a radio frequency converter for receiving and converting said first playback signal and said second playback signal into an output radio frequency signal for transmission to a television receiver;

an input select switch having a first terminal connectable to a reference potential and a second terminal connectable to a power supply, for producing an input control signal indicative of user selection between a first mode and a second mode;

an output control device for automatically producing an output control signal in correspondence with current modes of said first video deck, said second video deck, and said input select switch;

input analog switching means for connecting said first video deck to receive said second playback signal and said second video deck to receive said first playback signal in response to said input control signal indicating said second mode and for connecting said first video deck and said second video deck to receive said input video signal in response to said input control signal indicating said first mode, said input control signal being commonly applied to said output control device and to said input analog switching means; and an output analog switch for alternatively connecting said radio frequency converter to receive one of said first playback signal and said second playback signal in response to said output control signal;

wherein said output control device operates in accordance with the following truth table:

| Operating modes of each video deck | | | Input signals to the output control device | | | | |
|---|---|---|---|---|---|---|---|
| first deck | second deck | Selected video deck | A | B | C | D | E |
| PLAY | X | first deck | S1 | S2 | S2 | S2 | d |
| X | PLAY | second deck | S2 | S2 | S1 | S2 | d |
| REC | X | first deck | S2 | S1 | S2 | S2 | d |
| X | REC | second deck | S2 | S2 | S2 | S1 | d |
| PLAY | REC | second deck | S1 | S2 | S2 | S1 | S1 |
| REC | PLAY | first deck | S2 | S1 | S1 | S2 | S1 | where: first deck indicates said first video deck, second deck indicates said second video deck, "X" indicates one of said auxiliary modes, "REC" indicates the record mode, "PLAY" indicates said play mode, input signal A is provided when said first video deck is in said play mode, input signal B is provided when said first video deck is in said record mode, input signal C is provided when said second video deck is in said play mode, input signal D is provided when said second video deck is in said record mode, input signal E is provided when said first mode is selected, "d" indicates that the mode is immaterial, S1 indicates the input signals in a first state and S2 indicates the input signals in a second state.

2. A video signal processing system for a double deck video tape recorder comprising:

video tuner means for converting a radio-frequency input signal into an input video signal;

a first video deck for generating a first video signal, and having PLAY and RECORD functions for respectively reproducing and recording information from and to a recording medium;

a second video deck for generating a second video signal, and having said PLAY and RECORD functions;

radio-frequency converter means for generating a radio-frequency output signal in dependence upon said first video signal and said second video signal;

switching means for selectively interconnecting said first video deck, said second video deck, and said video tuner means, said switching means having a first mode for connecting said first video deck and said second video deck to receive said input video signal, and said switching means having a second mode for connecting said first video deck to receive said second video signal and said second video deck to receive said first video signal;

an input select switch having a first terminal connectable to a reference potential and a second terminal connectable to a power supply, said input select switch providing an input control signal to a control port of said switching means and to generation means for applying a logic scheme, said input control signal being indicative of a user selection of one of said first mode and said second mode;

output select means for connecting said radio-frequency converter to receive one of said first video Signal and said second video signal in response to an output control signal;

said generation means for automatically generating said output control signal in dependence upon reception of condition signals from said first and second video decks and said input control signal from said input select switch; and a first system controller and a second system controller for independently directing said RECORD and PLAY functions of said first video deck and said second video deck and providing said condition signals to said generation means.

3. A video signal processing system for a double deck video tape recorder, comprising:

a video tuner for converting an input radio-frequency signal into an input video signal;

an eight millimeter format video deck for generating a first video signal;

a VHS format video deck for generating a second video signal;

a radio-frequency converter for receiving said first and second video signals from said eight millimeter format and said VHS format video deck and for converting said first and second video signals into an output radio frequency signal for transmission to a television receiver;

an input select switch having a first terminal connectable to a reference potential and a second terminal connectable to a power supply, for producing an input control signal used to select a selected video signal to be applied to said video decks, said input control signal being indicative of one of a first mode and a second mode;

a pair of input analog switches for applying said selected video signal to each video deck by changing inter connecting states in accordance with said input control signal, said selected video signal applied to each video deck being said input video signal if said input control signal is indicative of said first mode and said selected video signal applied to each video deck being a video signal from the respective other video deck if said input control signal is indicative of said second mode, said input control signal being commonly applied to a control port on each of said pair of input analog switches and to output control means;

an output analog switch for alternatively applying the video signals from one of said eight millimeter format video deck and said VHS format video deck to said RF converter by changing inter connection states; and said output control means for automatically controlling the inter connection states of said output analog switch to select one of said eight millimeter format video deck and said VHS format video deck based solely upon input signals indicative of operating modes of said VHS format and eight millimeter format video decks and said input select switch, wherein said output control means operates in accordance with the following truth table:

| Operating modes of each video deck | | Selected video deck | Input signals to the output control means | | | | |
|---|---|---|---|---|---|---|---|
| 8 mm deck | VHS deck | | A | B | C | D | E |
| PLAY | X | 8 mm deck | 1 | 0 | 0 | 0 | d |
| X | PLAY | VHS deck | 0 | 0 | 1 | 0 | d |
| REC | X | 8 mm deck | 0 | 1 | 0 | 0 | d |
| X | REC | VHS deck | 0 | 0 | 0 | 1 | d |
| PLAY | REC | VHS deck | 1 | 0 | 0 | 1 | 0 |
| REC | PLAY | 8 mm deck | 0 | 1 | 1 | 0 | 0 |
| PLAY | REC | 8 mm deck | 1 | 0 | 0 | 1 | 1 |
| REC | PLAY | VHS deck | 0 | 1 | 1 | 0 | 1 |
| PLAY | PLAY | VHS deck | 1 | 0 | 1 | 0 | d |
| REC | REC | VHS deck | 0 | 1 | 0 | 1 | d |
| X | X | VHS deck | 0 | 0 | 0 | 0 | d | wherein 8 mm deck indicates said eight millimeter format video deck, VHS deck indicates said VHS format video deck, "X" indicates a mode other than a play operating mode or record operating mode, "REC" indicates the record operating mode, "PLAY" indicates the play operating mode, input signal A is provided when the eight millimeter format video deck is in the PLAY operating mode, input signal B is provided when the eight millimeter video deck is in the record operating mode, input signal C is provided when the VHS format video deck is in the play operating mode, input signal D is provided when the VHS format video deck is in the record operating mode, input signal E is provided by the input select switch when said input control signal is indicative of said first mode, and "d" indicates that the position of the input select switch is immaterial.

4. A dual deck video cassette recorder, comprising:
a housing;
video tuner means for converting a radio-frequency input signal into an input video signal;
first video deck means, disposed in said housing, for loading a first video tape, for generating a first video signal, and having first operating modes including a first play mode, a first record mode, and first auxiliary modes;
second video deck means, disposed in said housing, for loading a second video tape, for generating a second video signal, and having second operating modes including a second play mode, a second record mode, and second auxiliary modes;
radio-frequency converter means for generating a radio-frequency output signal in dependence upon said first video signal and said second video signal;
switching means for selectively interconnecting said first video deck means, said second video deck means, and said video tuner means, said switching means having a first mode for connecting said first video deck means and said second video deck means to receive said input video signal, and having a second mode for connecting said first video deck means to receive said second video signal and said second video deck means to receive said first video signal;
an input select switch having a first terminal connected to a ground terminal and a second terminal connected to a power supply terminal, said input select switch producing an input control signal which is applied to a control port of said switching means, said input control signal indicative of user selection between said first mode and said second mode;
output control means for automatically producing an output control signal in correspondence with said first and second operating modes of said first and second video deck means, and further in correspondence with said first and second modes of said switching means; and
output select means for connecting said radio-frequency converter to receive one of said first video signal and said second video signal in response to said output control signal.

5. The dual deck video cassette recorder of claim 4, further comprised of said output select means:
for connecting said radio-frequency converter means to receive said first video signal in response to said first video deck means being in said first play mode and said second video deck means being in one of said second auxiliary modes;
for connecting said radio-frequency converter means to receive said second video signal in response to said second video deck means being in said second play mode and said first video deck means being in one of said first auxiliary modes;
for connecting said radio-frequency converter means to receive said first video signal in response to said first video deck means being in said first record mode and said second video deck means being in one of said second auxiliary modes; and
for connecting said radio-frequency converter means to receive said second video signal in response to said second video deck means being in said second record mode and said first video deck means being in one of said first auxiliary modes.

6. The dual deck video cassette recorder of claim 5, wherein said first auxiliary modes comprise a first stop mode, a first fast forward mode, a first rewind mode, and a first eject mode, and said second auxiliary modes comprise a second stop mode, a second fast forward mode, a second rewind mode, and a second eject mode.

7. The dual deck video cassette recorder of claim 4, further comprised of said output select means:
for connecting said radio-frequency converter means to receive said second video signal in response to said first video deck means being in said first play mode, said second video deck means being in said second record mode, and said switching means being in said second mode;
for connecting said radio-frequency converter means to receive said first video signal in response to said first video deck means being in said first record mode, said second video deck means being in said second play mode, and said switching means being in said second mode;

for connecting said radio-frequency converter means to receive said first video signal in response to said first video deck means being in said first play mode, said second video deck means being in said second record mode, and said switching means being in said first mode; and for connecting said radio-frequency converter means to receive said second video signal in response to said first video deck means being in said first record mode, said second video deck means being in said second play mode, and said switching means being in said first mode.

8. The dual deck video cassette recorder of claim 7, wherein:
said first video deck means is an eight millimeter format video tape deck, and
said second video deck means is a VHS format video tape deck.

9. The dual deck video cassette recorder of claim 4, further comprised of said output select means:
for connecting said radio-frequency converter means to receive said second video signal in response to said first video deck means being in said first play mode and said second video deck means being in said second play mode; and
for connecting said radio-frequency converter means to receive said second video signal in response to said second video deck means being in said second record mode and said first video deck means being in said first record mode.

10. The dual deck video cassette recorder of claim 9, wherein:
said first video deck means is an eight millimeter format video tape deck, and
said second video deck means a VHS format video tape deck.

11. The dual deck video cassette recorder of claim 4, further comprised of said output select means:
for connecting said radio-frequency converter means to receive said first video signal in response to said first video deck means being in said first play mode and said second video deck means being in one of said second auxiliary modes;
for connecting said radio-frequency converter means to receive said second video signal in response to said second video deck means being in said second play mode and said first video deck means being in one of said first auxiliary modes;
for connecting said radio-frequency converter means to receive said first video signal in response to said first video deck means being in said first record mode and said second video deck means being in one of said second auxiliary modes;
for connecting said radio-frequency converter means to receive said second video signal in response to said second video deck means being in said second record mode and said first video deck means being in one of said first auxiliary modes;
for connecting said radio-frequency converter means to receive said second video signal in response to said first video deck means being in said first play mode, said second video deck means being in said second record mode, and said switching means being in said second mode;
for connecting said radio-frequency converter means to receive said first video signal in response to said first video deck means being in said first record mode, said second video deck means being in said second play mode, and said switching means being in said second mode;

for connecting said radio-frequency converter means to receive said first video signal in response to said first video deck means being in said first play mode, said second video deck means in being said second record mode, and said switching means being in said first mode; and for connecting said radio-frequency converter means to receive said second video signal in response to said first video deck means being in said first record mode, said second video deck means being in said second play mode, and said switching means being in said first mode.

12. The dual deck video cassette recorder of claim 11, further comprised of said output select means:
for connecting said radio-frequency converter means to receive said second video signal in response to said first video deck means being in said first play mode and said second video deck means being in said second play mode; and
for connecting said radio-frequency converter means to receive said second video signal in response to said second video deck means being in said second record mode and said first video deck means being in said first record mode.

13. The dual deck video cassette recorder of claim 12, wherein:
said first video deck means is an eight millimeter format video tape deck, and
said second video deck means is a VHS format video tape deck.

14. The dual deck video cassette recorder of claim 4, further comprised of said output select means:
for connecting said radio-frequency converter means to receive said second video signal in response to said first video deck means being in said first play mode, said second video deck means being in said second record mode, and said switching means being in said second mode; and
for connecting said radio-frequency converter means to receive said first video signal in response to said first video deck means being in said first record mode, said second video deck means being in said second play mode, and said switching means being in said second mode.

15. The dual deck video cassette recorder of claim 4, further comprised of said output select means:
for connecting said radio-frequency converter means to receive said first video signal in response to said first video deck means being in said first play mode, said second video deck means being in said second record mode, and said switching means being in said first mode; and
for connecting said radio-frequency converter means to receive said second video signal in-response to said first video deck means being in said first record mode, said second video deck means being in said second play mode, and said switching means being in said first mode.

16. A video signal processing system for a double deck video tape recorder, said system comprising:
a video tuner for converting an input radio frequency signal into an input video signal;

a first video deck for generating a first playback signal and having a play mode, a record mode, and auxiliary modes;
a second video deck for generating a second playback signal and having said play mode, said record mode, and said auxiliary modes;
an RF converter for receiving and converting said first playback signal and said second playback signal into an output radio frequency signal for transmission to a television receiver;
an input select switch for producing an input control signal indicative of user selection between a first mode and a second mode, said input select switch having a first terminal connected to a ground terminal and a second terminal connected to a power supply terminal, said input control signal being applied to a control port of an output control device and to each of a pair of input analog switches;
said output control device for automatically producing an output control signal in response to modes said first video deck, said second video deck, and said input select switch;
said pair of input analog switches for connecting said first video deck to receive said second playback signal and said second video deck to receive said first playback signal in response to said input control signal indicating said second mode and for connecting said first video deck and said second video deck to receive said input video signal in response to said input control signal indicating said first mode; and
an output analog switch for alternatively connecting said RF converter to receive one of said first playback signals and said second playback signal in response to said output control signal;
wherein said output control device operates in accordance with the following truth table:

| Operating modes of each video deck | | Select video deck | Input signals to the output control device | | | | |
|---|---|---|---|---|---|---|---|
| first deck | second deck | | A | B | C | D | E |
| PLAY | X | first deck | S1 | S2 | S2 | S2 | d |
| X | PLAY | second deck | S2 | S2 | S1 | S2 | d |
| REC | X | first deck | S2 | S1 | S2 | S2 | d |
| X | REC | second deck | S2 | S2 | S2 | S1 | d |
| PLAY | REC | second deck | S1 | S2 | S2 | S1 | S1 |
| REC | PLAY | first deck | S2 | S1 | S1 | S2 | S1 | where: first deck indicates said first video deck, second deck indicates said second video deck, "X" indicates one of said auxiliary modes, "REC" indicates the record mode, "PLAY" indicates said play mode, input signal A is provided when said first video deck is in said play mode, input signal B is provided when said first video deck is in said record mode, input signal C is provided when said second video deck is in said play mode, input signal D is provided when said second video deck is in said record mode, input signal E is provided when said first mode is selected, "d" indicates the mode is immaterial, S1 indicates the input signals in a first state and S2 indicates the input signals in a second state.

17. A method for automatically selecting an output video signal of a dual deck video tape recorder having a first mode enabling a first video tape deck and a second video tape deck to receive an input video signal received from an external source, and having a second mode enabling said first video tape deck to receive a second video signal generated by said second video tape deck and enabling said second video tape deck to receive a first video signal generated by said first video tape deck, said method comprising the steps of:
selecting said first mode by connecting a power supply to first and second control ports respectively controlling operation of first and second input switches to enable transmission of said input video signal from said first and second input switches to said first and second video tape decks, respectively;
selecting said second mode by connecting a reference potential to said first and second control ports to enable transmission of said second video signal from said first input switch to said first video tape deck, and to further enable transmission of said first video signal from said second input switch to said second video tape deck;
selectively enabling transmission of said first and second video signals in dependence upon an output control signal, said output control signal being generated in dependence upon said first and second modes and further in dependence upon operating modes of said first and second video tape decks;
providing said first video signal as said output video signal in response to said first video tape deck being in a first play mode and said second video tape deck being in a second auxiliary mode;
providing said second video signal as said output video signal in response to said second video tape deck being in a second play mode and said first video tape deck being in a first auxiliary mode;
providing said first video signal as said output video signal in response to said first video tape deck being in a first record mode and said second video tape deck being in said second auxiliary mode; and
providing said second video signal as said output video signal in response to said second video tape deck being in a second record mode and said first video tape deck being in said first auxiliary mode.

18. A method as claimed in claim 17, further comprising:
providing said second video signal as said output video signal in response to said first video tape deck being in said first play mode, said second video tape deck being in said second record mode, and said dual deck video tape recorder being in said second mode;
providing said first video signal as said output video signal in response to said first video tape deck being in said first record mode, said second video tape deck being in said second play mode, and said dual deck video tape recorder being in said second mode;
providing said first video signal as said output video signal in response to said first video tape deck being in said first play mode, said second video tape deck being in said second record mode, and said dual deck video tape recorder being in said first mode; and
providing said second video signal as said output video signal in response to said first video tape deck being in said first record mode, said second video tape deck being in said second play mode, and said dual deck video tape recorder being in said first mode.

19. A method as claimed in claim 17, further comprising:

providing said second video signal as said output video signal in response to said first video tape deck being in said first play mode and said second video tape deck being in said second play mode; and providing said second video signal as said output video signal in response to said second video tape deck being in said second record mode and said first video tape deck being in said second record mode.

20. A method as claimed in claim 19, wherein:

said first video tape deck is an eight millimeter format video tape deck, and said second video tape deck is a VHS format video tape deck.

* * * * *